(12) United States Patent
Jang et al.

(10) Patent No.: US 12,139,115 B2
(45) Date of Patent: Nov. 12, 2024

(54) ELECTROMECHANICAL BRAKE SYSTEM AND CONTROL METHOD THEREOF

(71) Applicant: HL MANDO CORPORATION, Pyeongtaek-si (KR)

(72) Inventors: Jaehoon Jang, Seoul (KR); Gunwoo Kang, Uiwang-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 751 days.

(21) Appl. No.: 17/350,399

(22) Filed: Jun. 17, 2021

(65) Prior Publication Data
US 2021/0394735 A1 Dec. 23, 2021

(30) Foreign Application Priority Data

Jun. 19, 2020 (KR) .................... 10-2020-0074627

(51) Int. Cl.
*F16D 65/14* (2006.01)
*B60T 1/06* (2006.01)
(Continued)

(52) U.S. Cl.
CPC .......... *B60T 13/746* (2013.01); *B60T 1/065* (2013.01); *B60T 8/17* (2013.01); *F16D 55/226* (2013.01);
(Continued)

(58) Field of Classification Search
CPC ...... B60T 13/746; B60T 13/741; B60T 1/065; B60T 8/17; F16D 55/226; F16D 65/18; F16D 2121/24; F16D 2125/40
See application file for complete search history.

(56) References Cited

U.S. PATENT DOCUMENTS

2014/0069750 A1* 3/2014 Nohira .................. B60T 13/741
188/71.8

FOREIGN PATENT DOCUMENTS

JP          5333114 B2    11/2013
KR   10-20070038131 A     4/2007

* cited by examiner

*Primary Examiner* — Nicholas J Lane
(74) *Attorney, Agent, or Firm* — Hauptman Ham, LLP

(57) ABSTRACT

Disclosed is an electromechanical brake system including a pair of pad plates to which brake pads for pressing a brake disc rotating together with a wheel are attached, a carrier on which the pair of plates are installed, a caliper housing slidably installed on the carrier, a piston installed in the caliper housing to move forward and backward, a power conversion device configured to move the piston forward and backward to press the pair of pad plates toward the disc, an actuator including a motor provided to provide a rotational force to the piston and a reduction device provided to reduce the rotational force of the motor and transmit the reduced rotational force to the power conversion device, and a controller provided to control the motor, wherein the controller is configured to determine whether a braking operation mode and a braking release mode are continuously repeated, determine, when the braking operation mode and the braking release mode are continuously repeated, whether a clamping force between the brake disc and the brake pad is not released after the braking operation mode is changed to the braking release mode depending on brake pedal information and clamping force information, and control the motor to release the clamping force based on the clamping force information when the clamping force is not released after being changed to the braking release mode.

10 Claims, 11 Drawing Sheets

(51) Int. Cl.
*B60T 8/17* (2006.01)
*B60T 13/74* (2006.01)
*F16D 55/226* (2006.01)
*F16D 65/18* (2006.01)
*F16D 121/24* (2012.01)
*F16D 125/40* (2012.01)

(52) U.S. Cl.
CPC .......... *F16D 65/18* (2013.01); *F16D 2121/24* (2013.01); *F16D 2125/40* (2013.01)

ELECTROMECHANICAL BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2020-0074627, filed on Jun. 19, 2020, in the Korean Intellectual Property Office, the disclosure of which is incorporated by reference herein in its entirety.

BACKGROUND

1. Field

The disclosure relates to an electromechanical brake system and a control method thereof.

2. Description of the Related Art

A brake system for performing braking is essential to a vehicle, and various types of brake systems have been proposed for the safety of drivers and passengers.

A brake system that supplies hydraulic pressure required for braking to wheel cylinders using a mechanically connected booster when a driver depresses a brake pedal has been mainly used. However, recently, as a next-generation brake system, an electromechanical brake system that receives a depressing force from the driver as an electric signal and operates an electric device such as a motor based on the electric signal to provide a braking force to a vehicle have been developed.

Such an electromechanical brake system converts a rotational force of a motor into a linear motion through the motor, a speed reducer, and the like to provide a clamping force to a brake disc, thereby performing a service brake and a parking brake of a vehicle.

However, in a conventional electromechanical brake system, when the driver continuously repeats a braking operation of depressing the brake pedal and a braking release operation of not depressing the brake pedal, the clamping force of the brake disc may not be released after changing from the braking operation to the braking release operation. For example, when the driver stepwise depresses the brake pedal until the vehicle reaches a stop line in front of a traffic light or another vehicle, the clamping force of the brake disc may not be released during the braking release operation of not depressing the brake pedal.

Therefore, in the conventional electromechanical brake system, an uncomfortable feeling may be felt in the process of continuously repeating the braking operation and the braking release operation.

Also, in the conventional electromechanical brake system, a drag phenomenon in which the brake disc and a brake pad are rubbed during the braking release operation may occur.

SUMMARY

It is an aspect of the disclosure to provide an electromechanical brake system capable of preventing an uncomfortable feeling caused by repeating an operation of depressing a brake pedal and an operation of not depressing the brake pedal, and a control method thereof.

It is an aspect of the disclosure to provide an electromechanical brake system capable of preventing a drag phenomenon caused in a braking release operation of not depressing a brake pedal, and a control method thereof.

Additional aspects of the disclosure will be set forth in part in the description which follows and, in part, will be obvious from the description, or may be learned by practice of the disclosure.

In accordance with an aspect of the disclosure, an electromechanical brake system includes a pair of pad plates to which brake pads for pressing a brake disc rotating together with a wheel are attached, a carrier on which the pair of plates are installed, a caliper housing slidably installed on the carrier, a piston installed in the caliper housing to move forward and backward, a power conversion device configured to move the piston forward and backward to press the pair of pad plates toward the disc, an actuator including a motor provided to provide a rotational force to the piston and a reduction device provided to reduce the rotational force of the motor and transmit the reduced rotational force to the power conversion device, and a controller provided to control the motor, wherein the controller is configured to determine whether a braking operation mode and a braking release mode are continuously repeated, determine, when the braking operation mode and the braking release mode are continuously repeated, whether a clamping force between the brake disc and the brake pad is not released after the braking operation mode is changed to the braking release mode depending on brake pedal information and clamping force information, and control the motor to release the clamping force based on the clamping force information when the clamping force is not released after being changed to the braking release mode.

The controller may be configured to determine whether the braking operation mode and the braking release mode are continuously repeated based on a rotation direction of the motor.

The controller may be configured to determine that the braking operation mode is performed when the motor rotates in one direction and determine that the braking release mode is performed when the motor rotates in the opposite direction.

The controller may be configured to determine whether the clamping force is not released in a state in which a driver does not intend to brake based on the brake pedal information and the clamping force information.

The state in which the driver does not intend to brake may be a state in which the driver completely releases his/her foot from the brake pedal.

The controller may be configured to rotate the motor in a release direction opposite to an operation direction of an electromechanical brake when the clamping force is not released.

The controller may be configured to determine from a map a target motor current value for releasing the clamping force depending on a clamping force value and rotate the motor with the determined target motor current value.

The map may have a correlation in which the target motor current value increases as the clamping force value increases.

In accordance with an aspect of the disclosure, a control method of an electromechanical brake system, which includes a pair of pad plates to which brake pads for pressing a brake disc rotating together with a wheel are attached; a carrier on which the pair of plates are installed; a caliper housing slidably installed on the carrier; a piston installed in the caliper housing to move forward and backward; a power conversion device configured to move the piston forward and backward to press the pair of pad plates toward the disc;

and an actuator including a motor and a reduction device provided to provide a rotational force to the piston, includes determining whether a braking operation mode and a braking release mode are continuously repeated, determining whether the braking operation mode is changed to the braking release mode when the braking operation mode and the braking release mode are continuously repeated, determining whether a clamping force between the brake disc and the brake pad is not released after being changed to the braking release mode depending on brake pedal information and clamping force information when the braking operation mode is changed to the braking release mode, and controlling the motor to release the clamping force based on the clamping force information when the clamping force is not released after being changed to the braking release mode.

The determining of whether the braking operation mode and the braking release mode are continuously repeated may include determining whether the braking operation mode and the braking release mode are continuously repeated based on a rotation direction of the motor.

The determining of whether the clamping force is not released may include determining whether the clamping force is not released in a state in which a driver does not intend to brake based on the brake pedal information and the clamping force information.

The determining of whether the clamping force is not released may include determining whether the clamping force is not released in a state in which a driver completely releases his/her foot from the brake pedal.

The controlling of the motor to release the clamping force may include rotating the motor in a release direction opposite to an operation direction of an electromechanical brake when the clamping force is not released.

The controlling of the motor to release the clamping force may include determining from a map a target motor current value for releasing the clamping force depending on a clamping force value and rotating the motor with the determined target motor current value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
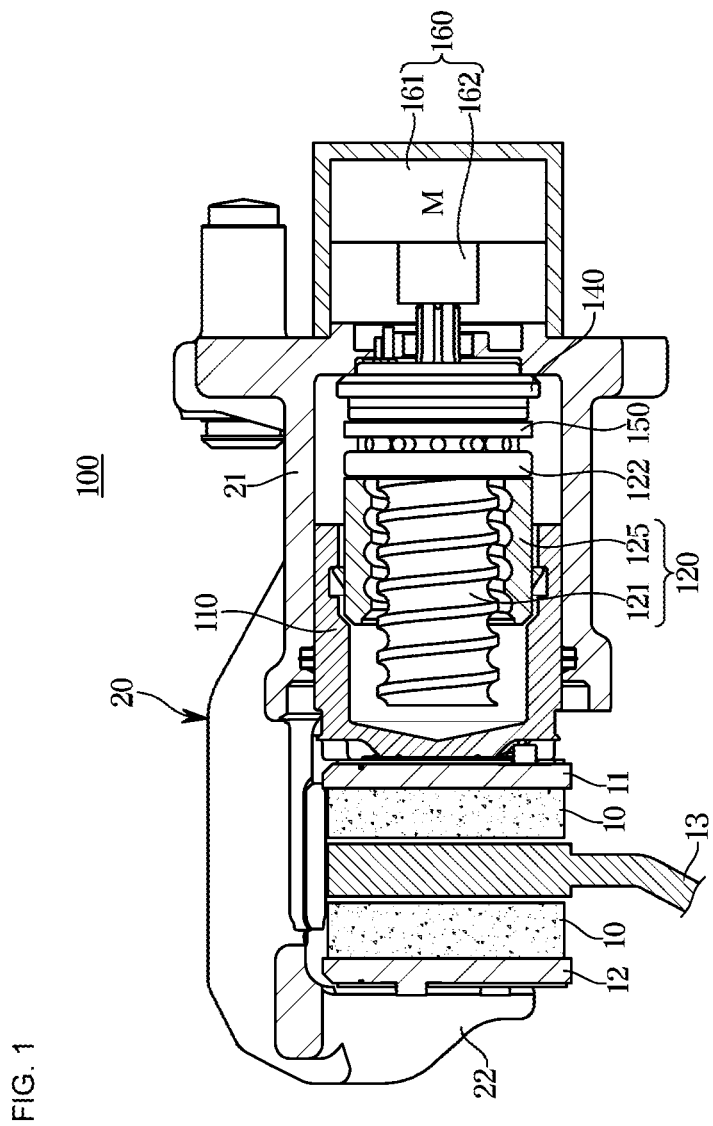
FIG. 1 illustrates a configuration of an electromechanical brake included in an electromechanical brake system according to an embodiment.

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms "a" "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

FIG. 1 illustrates a configuration of an electromechanical brake included in an electromechanical brake system according to an embodiment.

Referring to FIG. 1, an electromechanical brake 100 may include a carrier (not shown) on which a pair of pad plates 11 and 12 are installed to press a brake disc 13 rotating together with a wheel of a vehicle, a caliper housing 20 slidably installed on the carrier to operate the pair of pad plates 11 and 12, a piston 110 installed in the caliper housing 20 to move forward and backward, an actuator 160 provided to generate and provide a rotational driving force for moving the piston 110, a power conversion device 120 provided to convert the rotational driving force provided by the actuator 160 into a linear motion and transmit the linear motion to the piston 110 so that the piston 110 moves forward and backward in an axial direction, a sensor 140 provided to detect a close contact force between the brake disc 13 and a brake pad 10 or a clamping force of the brake pad 10, and a controller 220 provided to control the operation of the actuator 160 based on information provided from the sensor 140.

The brake pad 10 may be attached to an inner surface of each of the pair of pad plates 11 and 12. The pair of pad plates 11 and 12 include the inner pad plate 11 disposed to be in contact with the piston 110 and the outer pad plate 11 disposed to be in contact with a finger 22 of the caliper housing 20, which will be described later, and may be slidably installed on the carrier. That is, the pair of pad plates 11 and 12 may be installed on the carrier fixed to a vehicle body to move forward and backward toward opposite sides of the brake disc 13, thereby performing braking.

The caliper housing 20 includes the finger 22 formed to be bent downwardly on a front side (left side with reference to FIG. 1) to operate the outer pad plate 12, and a cylinder 21 in which the piston 110 is installed, and may be slidably fastened to the carrier. The cylinder 21 and the finger 22 may be integrally formed. The caliper housing 20 as described above is slid from the carrier by a reaction force depending on the movement of the piston 110 during braking of the vehicle to be moved toward the brake disc 13, so that the outer pad plate 12 may approach the brake disc 13 side by the finger 22 to press the brake disc 13.

The power conversion device 120 may include a spindle 121 provided to rotate by receiving a driving force from the actuator 160, a nut 125 disposed inside the piston 110 and screwed to the spindle 121 to move forward together with the piston 110 by rotation of the spindle 121 in a first direction or move backward together with the piston 110 by rotation of the spindle 121 in a second direction, and a plurality of balls (not shown) interposed between the spindle 121 and the nut 125. The power conversion device 120 as described above may be provided as a ball-screw type converter for converting a rotational motion of the spindle 121 into a linear motion. The rotation of the spindle 121 in the first direction refers to a rotation direction in which the nut 125 is moved forward by the rotation of the spindle 121, and the rotation of the spindle 121 in the second direction opposite to the first direction refers to a rotation direction in which the nut 125 is moved backward by the rotation of the spindle 121.

The spindle 121 is rotatably provided on the cylinder 21, and a flange 122 extending in a radial direction may be provided. The flange 122 may be provided as a separate part and fixed to the spindle 121 to rotate integrally with the spindle 121. The spindle 121 may be provided such that one side (left) thereof is coupled to the nut 125 with respect to the flange 122 and the other side (right) is connected to the actuator 160, thereby receiving a driving force from the actuator 160. Accordingly, the one side of the spindle 121 may be inserted into the nut 125, and an external thread 123 may be formed on an outer circumferential surface thereof for coupling with the nut 125. A bearing 150 and the sensor 140 for detecting a clamping force between the brake disc 13 and the brake pad 10 by detecting a load applied to the spindle 121 may be disposed on the other side of the spindle 121.

The sensor 140 may be provided to detect a close contact force or a clamping force between the brake disc 13 and the brake pad 10. The sensor 140 may be provided as a force sensor that detects a clamping force between the brake disc 13 and the brake pad 10 by detecting a load of the spindle 121 or the actuator 160, but not limited thereto. The sensor 140 may transmit the detected clamping force information of the brake pad 10 to the controller 220, and the controller 220 may determine wear or drag of the brake pad 10 based on the clamping force information detected by the sensor 140.

The actuator 160 may include a motor 161 and a reduction device 162 having a plurality of reduction gears and may receive power from a power supply device disposed in the vehicle to generate a driving force. The actuator 160 may be connected to the other end of the spindle 121 to transmit the generated driving force to the spindle 121, thereby rotating the spindle 121. The actuator 160 may be installed on the outside of the caliper housing 20, and the reduction device 162 may be provided in various structures such as a planetary gear assembly and a worm structure to reduce the power of the motor 161 and provide the reduced power to the spindle 121. The motor 161 may press or release the piston 110 by rotating the spindle 121 to move the nut 125 forward and backward. The reduction device 162 may be provided between an output side of the motor 161 and the spindle 121.

Figure 2:
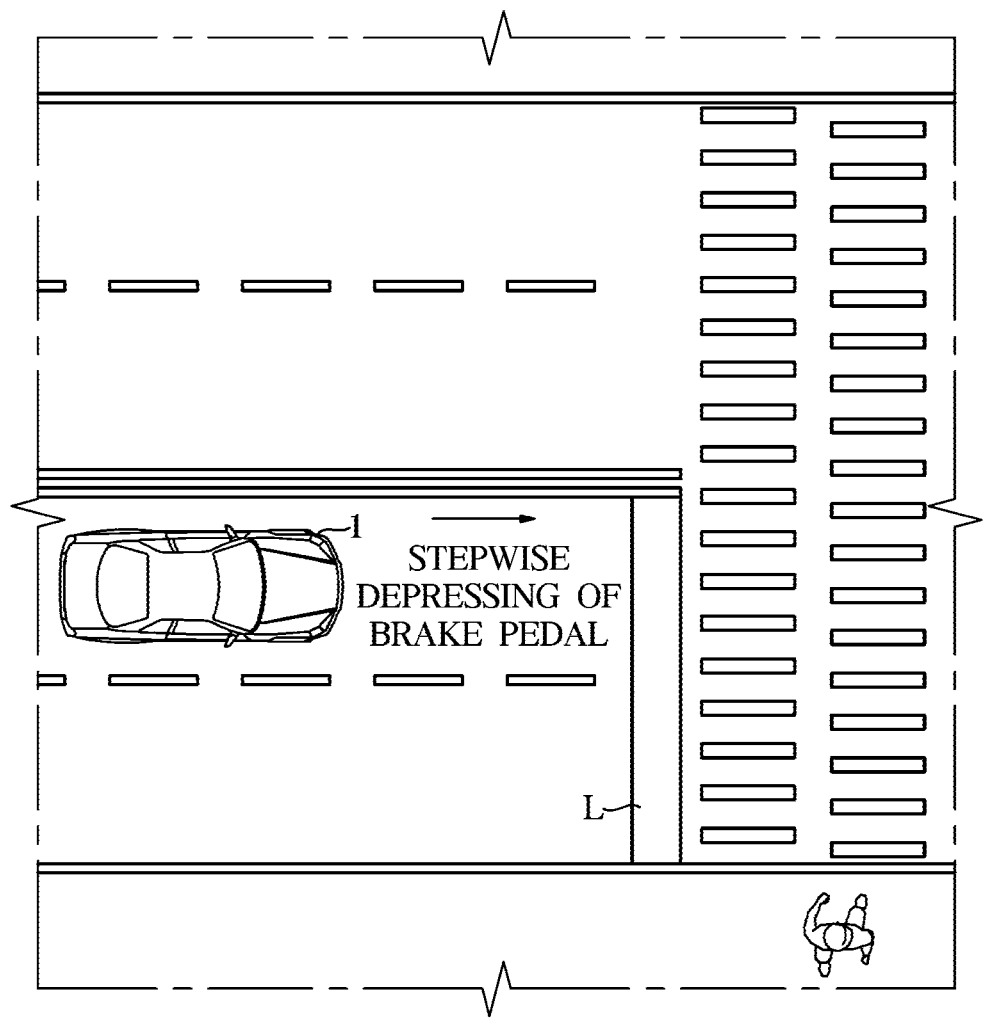
FIG. 2 illustrates a process of stepwise depressing a brake pedal in a vehicle to which the electromechanical brake system according to an embodiment is applied.

FIG. 2 illustrates a process of stepwise depressing a brake pedal in a vehicle to which the electromechanical brake system according to an embodiment is applied.

Referring to FIG. 2, the driver of the vehicle 1 may repeatedly perform a braking operation of depressing the brake pedal and a braking release operation of not depressing the brake pedal, for a short time. For example, the driver of the vehicle 1 may stepwise depress the brake pedal until reaching a stop line L in front of a traffic light or another vehicle.

Figure 3:
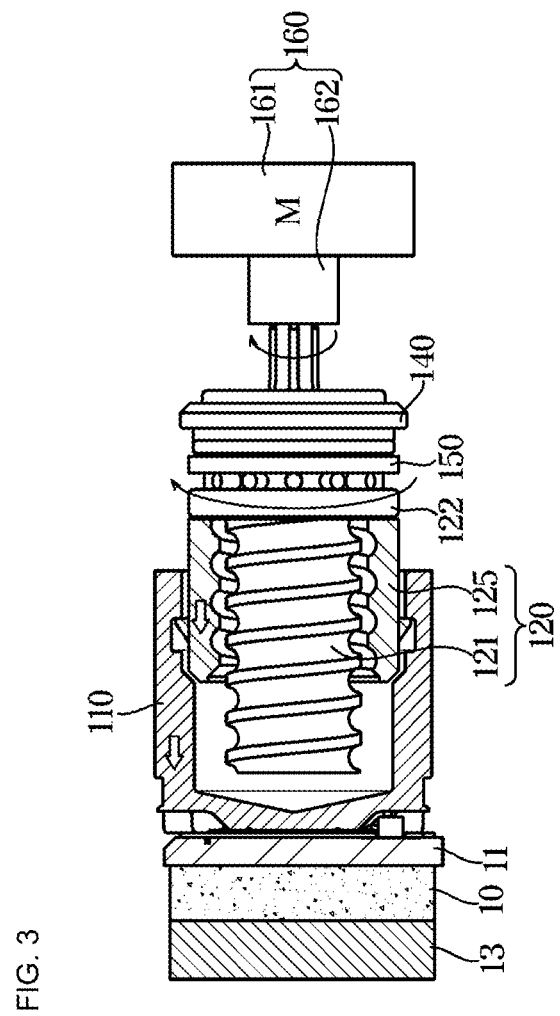
FIG. 3 illustrates a braking operation of the electromechanical brake included in the electromechanical brake system according to an embodiment.

FIG. 3 illustrates a braking operation of the electromechanical brake included in the electromechanical brake system according to an embodiment.

Referring to FIG. 2, the electromechanical brake 100 may perform the braking operation of generating a clamping force in which by rotating the spindle 121 in one direction (solid arrow direction) using the actuator 160, the nut 125 moves to press the piston 110, the piston 110 pressed by the movement of the nut 125 presses the inner pad plate 11, and the brake pad 10 comes into close contact with the brake disc 13.

Figure 4:
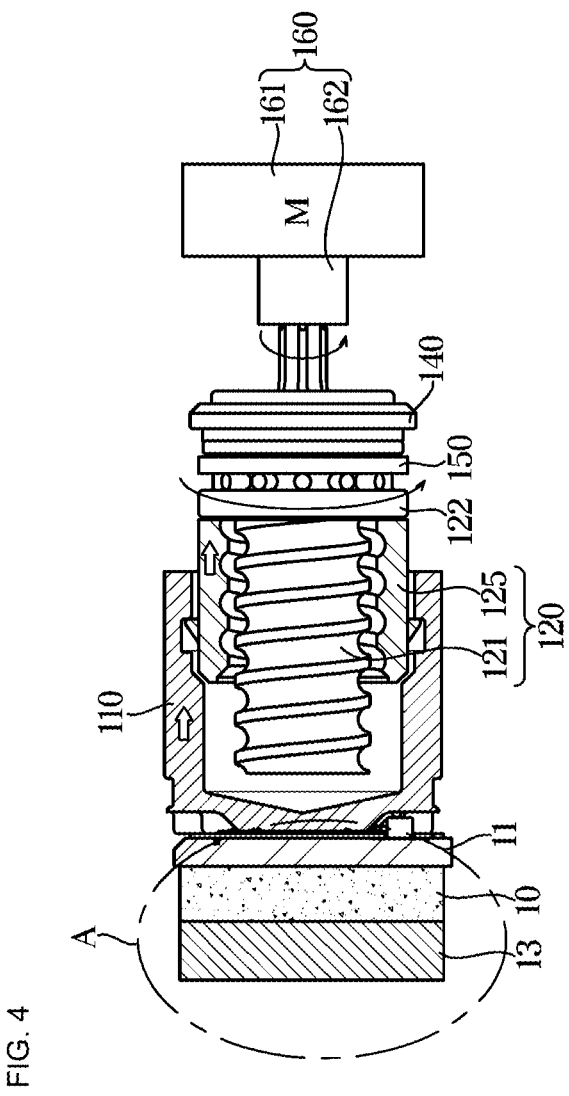
FIG. 4 illustrates a braking release operation of the electromechanical brake included in the electromechanical brake system according to an embodiment.

FIG. 4 illustrates a braking release operation of the electromechanical brake included in the electromechanical brake system according to an embodiment.

Referring to FIG. 4, the electromechanical brake 100 may perform the braking release operation of releasing the generated clamping force in which by rotating the spindle 121 in the opposite direction (solid arrow direction) using the actuator 160, the nut 125 pressing the piston 110 moves backward, the pressing on the piston 110 is released by the backward movement of the nut 125, and the brake pad 10 is spaced apart from the brake disc 13 by releasing the pressing on the piston 110.

Figure 5:
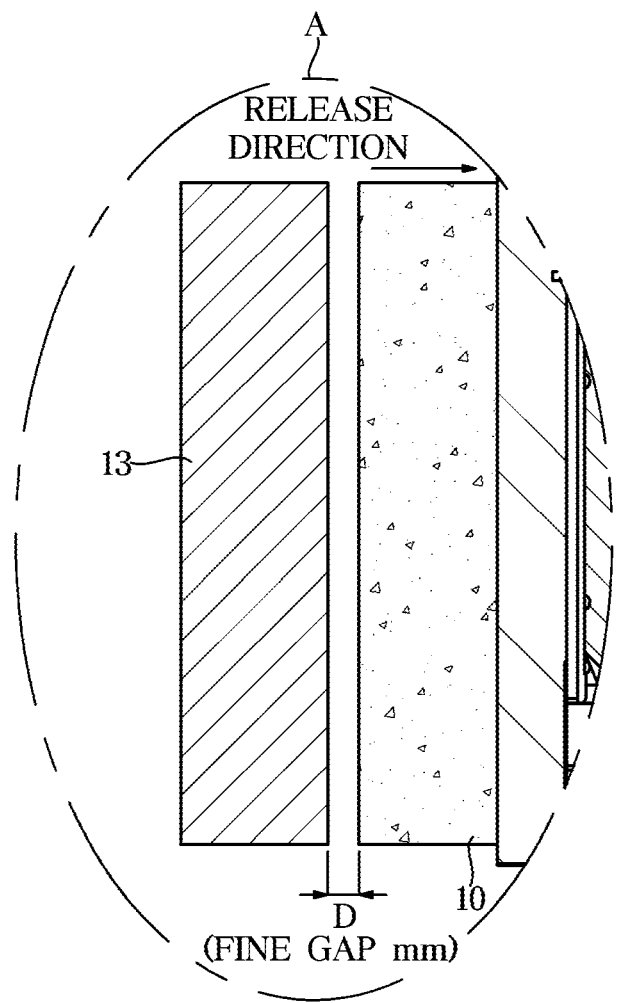
FIG. 5 is an enlarged view of part A in FIG. 4, illustrating a state in which a brake pad is in fine contact with a brake disc in the braking release operation of the electromechanical brake.

FIG. 5 is an enlarged view of part A in FIG. 4, illustrating a state in which a brake pad is in fine contact with a brake disc in the braking release operation of the electromechanical brake.

Referring to FIG. 5, the electromechanical brake 100 may not be able to release the generated clamping force because in the process of stepwise depressing the brake pedal by the driver, a surface of the brake pad 10 may come into contact with the brake disc 13 with a fine gap D therebetween in the braking release operation (release direction). By an uneven surface of the brake pad 10 and/or the brake disc 13, shaking due to improper mounting of the brake pad 10 and/or the brake disc 13, a delay of the backward movement of the brake pad 10 according to a linked operation of an ABS system (anti-lock braking system) or a linked operation of a TCS system (traction control system), and the like, the brake pad 10 may be in fine contact with the brake disc 13. The ABS system is a system that temporarily releases the braking of wheels in response to the slip of the wheels detected while braking the vehicle, and the TCS system is a system that temporarily brakes the wheels in response to the slip of the wheels detected while driving the vehicle.

Figure 6:
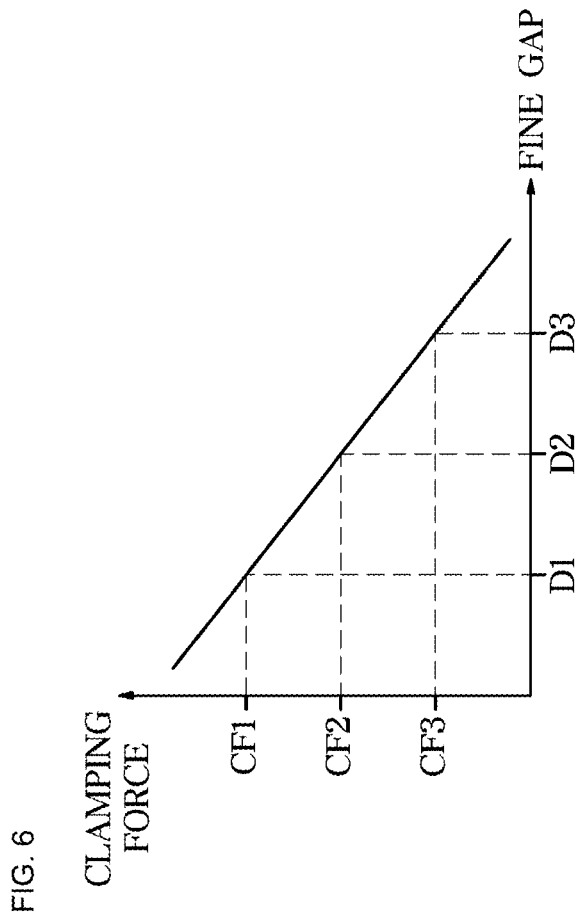
FIG. 6 illustrates a clamping force generated by a fine-gap contact in the electromechanical brake included in the electromechanical brake system according to an embodiment.

FIG. 6 illustrates a clamping force generated by a fine-gap contact in the electromechanical brake included in the electromechanical brake system according to an embodiment.

Referring to FIG. 6, in the process of the driver stepwise depressing the brake pedal, the electromechanical brake 100 may generate a clamping force value CF1 when a gap between the brake pad 10 and the brake disc 13 is D1, generate a clamping force value CF2 lower than the clamping force value CF1 when the gap between the brake pad 10 and the brake disc 13 is D2, and generate a clamping force value CF3 lower than the clamping force value CF2 when the gap between the brake pad 10 and the brake disc 13 is D3. The electromechanical brake 100 may generate a lower clamping force value as the fine gap increases. The sensor 140 may detect the clamping force values CF1, CF2, and CF3 generated by the contact spaced apart by the fine gaps D1, D2, and D3.

In the process of repeating the operation of the driver pressing the brake pedal and the operation of not pressing the brake pedal, when the clamping force is not released after changing to the braking release mode, the electromechanical brake system according to an embodiment further rotates the motor 161 in the release direction to release the clamping force to prevent an uncomfortable feeling caused in the continuous repetition process and to prevent a drag phenomenon caused in the braking release operation of not depressing the brake pedal.

Figure 7:
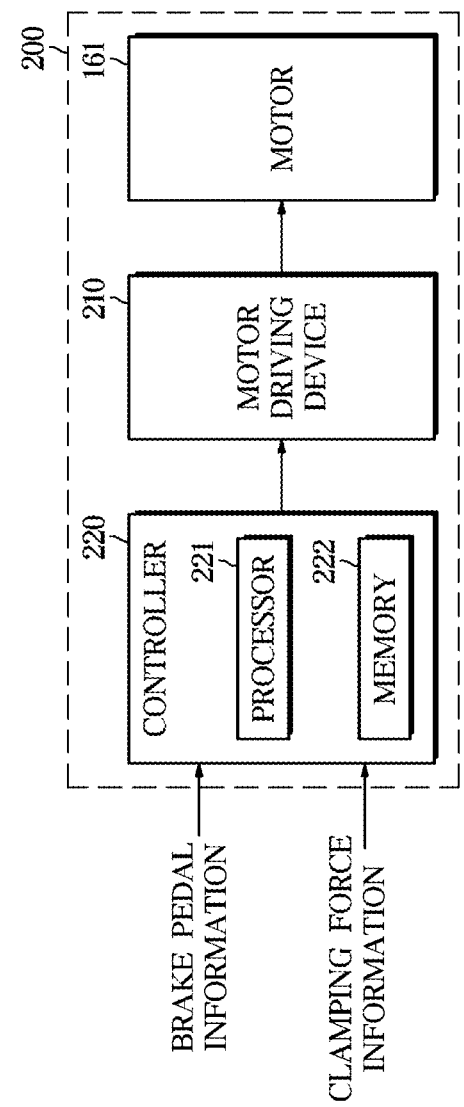
FIG. 7 illustrates a configuration of the electromechanical brake system according to an embodiment.

FIG. 7 illustrates a configuration of the electromechanical brake system according to an embodiment.

Referring to FIG. 7, an electromechanical brake system 200 may include the motor 161, a motor driving device 210, and the controller 220.

The controller 220 may receive brake pedal information through a brake pedal position sensor and may receive brake pedal information from another system that performs CAN (controller area network) communication, which is an in-vehicle network. For example, the controller 220 may receive brake pedal information from the ABS system or the TCS system. The brake pedal information may be a brake pedal manipulation signal depressed by the driver. The controller 220 may receive clamping force information between the brake disc 13 and the brake pad 10 from the sensor 140. The clamping force information may be a clamping force between the brake pad 10 and the brake disc 13.

The controller 220 may drive the motor 161 by a braking signal generated by manipulation of the brake pedal depressed by the driver. The controller 220 may perform the braking operation (Apply) mode or the braking release mode depending on the braking signal generated by the manipulation of the brake pedal depressed by the driver.

The motor driving device 210 may drive the motor 161. The motor driving device 210 may drive the motor 161 in a forward rotation direction or a reverse rotation direction. The motor driving device 210 may allow the electromechanical brake 100 to perform the braking release operation when driving the motor 161 in the forward rotation direction, and may allow the electromechanical brake 100 to perform the braking operation when driving the motor 161 in the reverse rotation direction. The motor driving device 210 may generate a motor current for driving the motor 161 in the forward rotation direction or the reverse rotation direction and apply the generated current to the motor 161. For example, the motor driving device 210 may include an H-bridge circuit including a plurality of power switching elements to drive the motor 141 in the forward or reverse rotation direction.

The controller 220 may be integrated with the motor driving device 210 as one device. The controller 220 may include a processor 221 and a memory 222.

The processor 221 may determine whether the braking operation mode and the braking release mode of the electromechanical brake 100 are continuously repeated within a preset time interval (e.g., a short time interval). The processor 221 may determine whether the braking operation mode and the braking release mode are continuously repeated based on the rotation direction of the motor 161. For example, the processor 221 may determine that the braking operation mode is being performed when the motor 161 rotates in one direction and may determine that the braking release mode is being performed when the motor 161 rotates in the opposite direction. The processor 221 may determine a repetitive process in which the driver continuously depresses and does not depress the brake pedal.

When the braking operation mode and braking release mode are continuously repeated, the processor 221 may determine whether the clamping force is not released after changing from the braking operation mode to the braking release mode. The processor 221 may determine whether the clamping force is not released in a state in which the driver does not intend to brake based on the brake pedal information and the clamping force information. The state in which the driver does not intend to brake may be a state in which the driver has completely released his/her foot from the brake pedal. When the processor 221 receives the clamping force values CF1, CF2, and CF3 generated by the contact spaced apart by the fine gaps D1, D2, and D3 from the sensor 140, the processor 221 may determine that the clamping force is not released.

Figure 8:
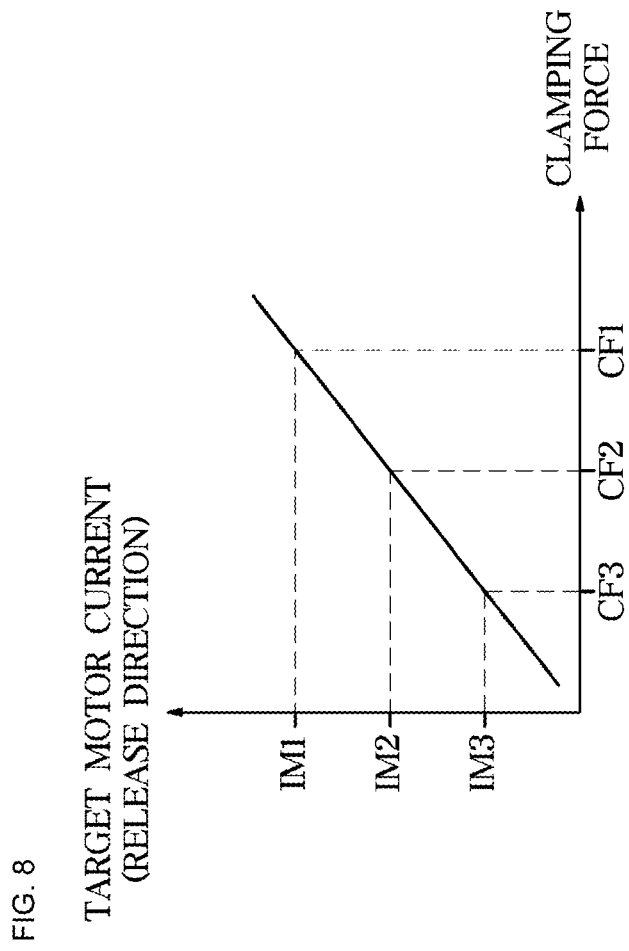
FIG. 8 illustrates a map in which each of target motor current values for releasing the clamping force in the electromechanical brake system according to an embodiment is predetermined.

FIG. 8 illustrates a map in which each of target motor current values for releasing the clamping force in the electromechanical brake system according to an embodiment is predetermined.

Referring to FIG. 8, when the clamping force is not released after changing to the braking release mode, the processor 221 may determine each of target motor current values IM1, IM2, and IM3 for releasing the clamping force depending on the clamping force values CF1, CF2, and CF3 generated by the contact spaced apart by the fine gaps D1, D2, and D3, from a map stored in the memory 222. Each of the target motor current values IM1, IM2, and IM3 may be a calibration value that may be corrected through an experiment. The map may have a correlation in which the larger the clamping force values CF1, CF2, and CF3 (CF3<CF2<CF1), the larger the target motor current values IM1, IM2, and IM3 (IM3<IM2<IM1). For example, when the clamping force value is CF3, the target motor current value IM3 for releasing the clamping force may be predetermined in the map to correspond to CF3. Also, when the clamping force value is CF1 larger than CF2, the target motor current value IM1 for releasing the clamping force may be predetermined in the map to correspond to CF1.

In order to release the clamping force values CF1, CF2, and CF3 generated by the contact spaced apart by the fine gaps D1, D2, and D3, the processor 221 may control the motor driving device 210 to rotate the motor 161 with a determined target motor current value among the target motor current values IM1, IM2, and IM3. The motor driving device 210 may generate a target motor current for rotating in the release direction that is opposite to an operation (Apply) direction of the electromechanical brake 100 based on the determined target motor current value, and may apply the target motor current to the motor 161. For example, the target motor current may be a reverse current. The motor 161 may rotate further to release the clamping force in the release direction. The motor 161 may cancel the generated clamping force value until the brake pad 10 and the brake disc 13 are positioned to be spaced apart from each other, which the clamping force is not generated.

The processor 221 may include a digital signal processor that processes the brake pedal information and the clamping force information, and a micro control unit (MCU) that generates a motor driving signal for releasing the clamping force.

The memory 222 may store a program and/or data for the processor 221 to process the brake pedal information and the clamping force information, a program and/or data for the processor 221 to generate a motor driving signal to release the clamping force, and a program and/or data for setting a map to release the clamping force.

The memory 222 may temporarily store the brake pedal information, the clamping force information, and map information, and may temporarily store the processing result of the processor 421 on the brake pedal information, the clamping force information, and the map information.

The memory 222 includes not only a volatile memory such as S-RAM and D-RAM, but also a nonvolatile memory such as a flash memory, a read only memory (ROM), and an erasable programmable read only memory (EPROM).

Figure 9:
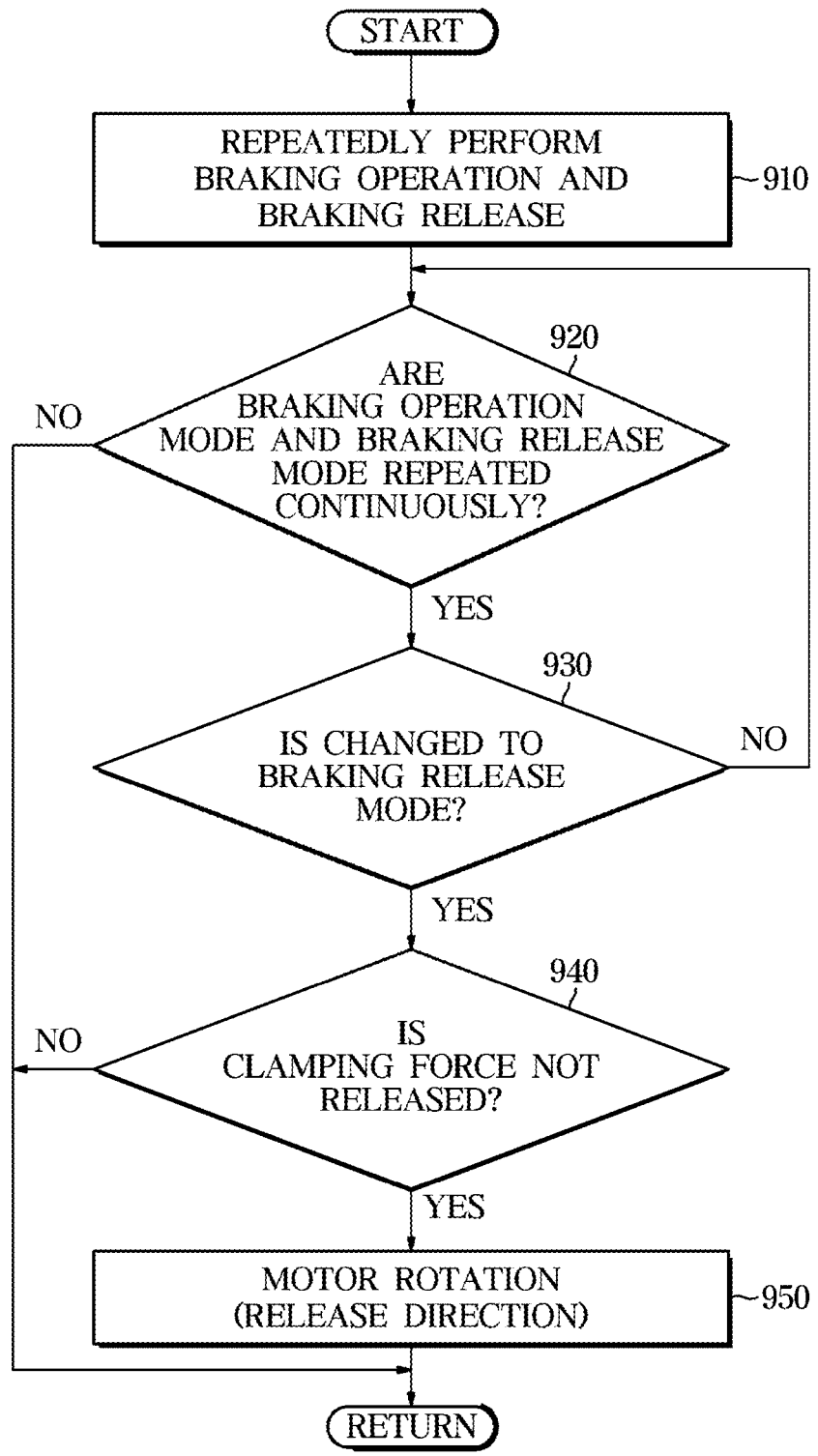
FIG. 9 illustrates a control method of the electromechanical brake system according to an embodiment.
Figure 10:
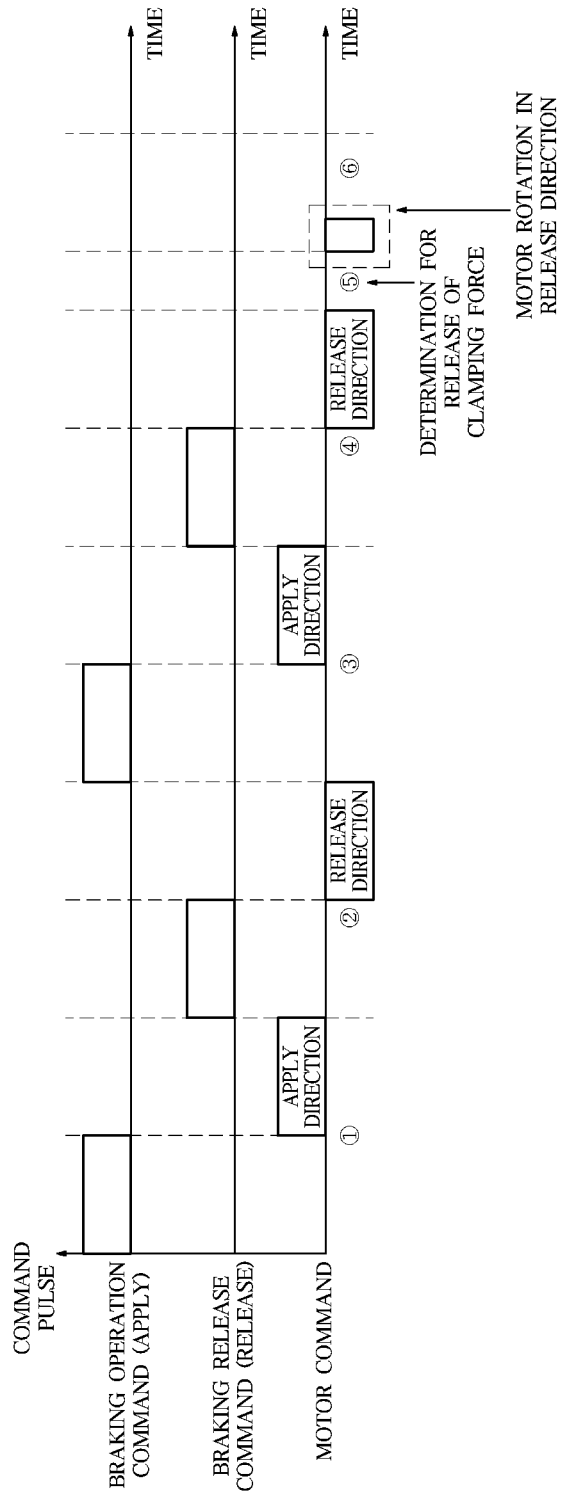
FIG. 10 illustrates a process until the clamping force is released in the electromechanical brake system according to an embodiment.

FIG. 9 illustrates a control method of the electromechanical brake system according to an embodiment, and FIG. 10 illustrates a process until the clamping force is released in the electromechanical brake system according to an embodiment.

Referring to FIGS. 9 and 10, the electromechanical brake system 200 may perform step ①.

The driver of the vehicle 1 may repeatedly perform the braking operation in which the brake pedal is depressed and the braking release operation in which the brake pedal is not depressed, for a predetermined period of time (910). The controller 220 may transmit a braking operation (Apply) command to the motor driving device 210 in response to the braking signal of the brake pedal, and the motor driving device 210 may transmit a motor command for the braking operation to the motor 161. The motor 161 may rotate in the operation direction for the braking operation. The electromechanical brake 100 may perform the braking operation to generate a clamping force.

Thereafter, the electromechanical brake system 200 may perform step ②. The controller 220 may transmit a braking release command to the motor driving device 210 in response to a braking release signal of the brake pedal, and the motor driving device 210 may transmit the motor command for releasing the braking operation to the motor 161. The motor 161 may rotate in the release direction to release the braking operation. The electromechanical brake 100 may perform the braking release operation to release the clamping force.

Thereafter, the electromechanical brake system 200 may repeatedly perform steps ③ and ④.

Thereafter, the electromechanical brake system 200 may perform step ⑤.

The controller 220 may determine whether the braking operation mode and the braking release mode of the electromechanical brake 100 are continuously repeated (920). The controller 220 may determine whether the braking operation mode and the braking release mode are continuously repeated based on the rotation direction of the motor 161. The controller 220 may determine that the braking operation mode is being performed when the motor 161 rotates in one direction (operation direction) and may determine that the braking release mode is being performed when the motor 161 rotates in the opposite direction (release direction). The controller 220 may perform the braking operation mode or the braking release mode depending on the braking signal generated by manipulation of the brake pedal depressed by the driver.

When the braking operation mode and the braking release mode are continuously repeated, the controller 220 may determine whether the braking operation mode is changed to the braking release mode (930). When the rotation of the motor 161 is changed from one direction (operation direction) to the opposite direction (release direction), the controller 220 may determine the braking operation mode is changed to the braking release mode.

Because more time may be needed to determine whether the braking operation mode is changed to the braking release mode when the braking operation mode is not changed to the braking release mode as a result of the determination in the process 930, the controller 220 may determine whether the braking operation mode and the braking release mode are continuously repeated by lengthening the determination time (920).

When the braking operation mode and the braking release mode are not continuously repeated as a result of the determination in the process 920, the controller 220 may not determine the repetition process of the braking operation mode and the braking release mode.

When the braking operation mode is changed to the braking release mode, the controller 220 may determine whether the clamping force is not released after being changed to the braking release mode (940). The controller 200 may determine whether the clamping force is not released in the absence of the driver's braking intention based on the brake pedal information and the clamping force information. The state in which the driver does not intend to brake may be a state in which the driver has completely released his/her foot from the brake pedal.

When the clamping force is released after being changed to the braking release mode as a result of the determination in the process 940, the controller 200 may not determine the clamping force.

Figure 11:
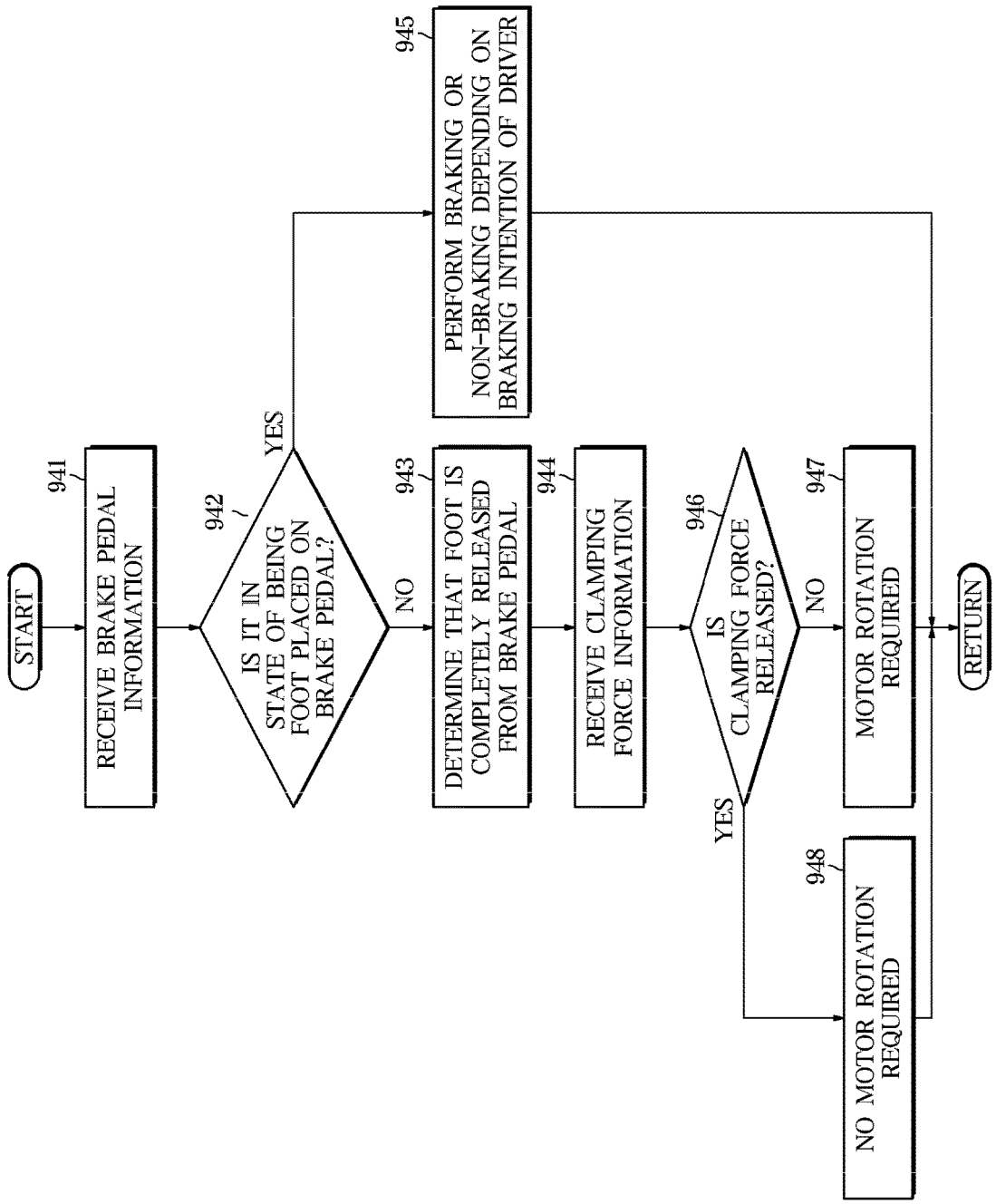
FIG. 11 illustrates a method of determining whether the clamping force is not released in the electromechanical brake system according to an embodiment.

FIG. 11 illustrates a method of determining whether the clamping force is not released in the electromechanical brake system according to an embodiment.

Referring to FIG. 11, the controller 220 may receive the brake pedal information through the brake pedal position sensor (941). The controller 220 may receive the brake pedal information from the ABS system or the TCS system.

The controller 220 may determine whether or not the foot of the driver is placed on the brake pedal based on the brake pedal information (942). The controller 220 may determine whether or not the foot of the driver is placed on the brake pedal based on the brake pedal manipulation signal depressed by the driver.

When the foot of the driver is not in the state of being placed on the brake pedal, the controller 220 may determine that the driver has completely released his/her foot from the brake pedal (943) and receive the clamping force information obtained by the sensor 140 (944).

When the foot of the driver is placed on the brake pedal as a result of the determination in the process 942, the controller 220 may perform braking or non-braking depending on the braking intention of the driver (945). When the driver depresses the brake pedal in the state in which the foot of the driver is placed on the brake pedal, braking may be performed, and when the driver releases the brake pedal, braking release may be performed.

The controller 220 may determine whether the clamping force is not released based on the clamping force information (946). When the controller 220 receives the clamping force values CF1, CF2, and CF3 generated by the contact spaced apart by the fine gaps D1, D2, and D3, the controller 220 may determine that the clamping force is not released.

When the clamping force is not released, the controller 220 may determine that rotation of the motor 161 is necessary to release the clamping force (947).

When the clamping force is released as a result of determination in process 946, the controller 220 may determine that the rotation of the motor 161 is unnecessary (948).

Thereafter, the electromechanical brake system 200 may perform step ⑥.

When the clamping force is not released after being changed to the braking release mode (940), the controller 220 may rotate the motor 161 to release the clamping force (950). The controller 220 may determine from the map the target motor current values IM1, IM2, and IM3 for releasing the clamping force depending on the clamping force values CF1, CF2, and CF3 generated by the contact spaced apart by the fine gaps D1, D2, and D3.

In order to release the clamping force values CF1, CF2, and CF3 generated by the contact spaced apart by the fine gaps D1, D2, and D3, the controller 220 may control the motor driving device 210 to rotate the motor 161 with a determined target motor current value among the target motor current values IM1, IM2, and IM3. The motor driving device 210 may generate a target motor current for rotating the motor 161 in the release direction that is opposite to the operation direction of the electromechanical brake 100 based on the determined target motor current value, and may apply the target motor current to the motor 161. The motor driving device 210 may transmit the motor command for releasing the clamping force to the motor 161. The motor 161 may rotate in the release direction to release the clamping force. The electromechanical brake 100 may perform a clamping force release operation for releasing the clamping force.

In a conventional electromechanical brake system, in the case in which the clamping force is not released after being changed to the braking release mode in the repetitive process in which the driver continuously depresses and does not depress the brake pedal, it is necessary to perform control to always maintain a clearance by finding an origin point and retreating back from the origin point by an arbitrary section (e.g., −0.5 mm section) when controlling a position where the brake pad 10 comes into contact with the brake disc 13 to release the clamping force, but the position where the brake pad 10 comes into contact with the brake disc 13 is not an absolute position, and it is difficult to find the origin point.

As described above, the electromechanical brake system 200 according to an embodiment is not of a type that finds an origin point to release the clamping force, but of a type that further rotates the motor 161 in the release direction based on the target motor current values predetermined in the map to release the clamping force, an uncomfortable feeling caused by repeating the operation of depressing the brake pedal and the operation of not depressing the brake pedal may be prevented, and a drag phenomenon caused by the braking release operation of not depressing the brake pedal may be prevented.

As is apparent from the above, according to an aspect of the disclosure, an uncomfortable feeling caused by repeating an operation of depressing a brake pedal and an operation of not depressing the brake pedal can be prevented.

Further, according to an aspect of the disclosure, a drag phenomenon caused by a braking release operation of not depressing the brake pedal can be prevented.

What is claimed is:

1. An electromechanical brake system comprising:
    a pair of pad plates to which brake pads for pressing a brake disc rotating together with a wheel are attached;
    a carrier on which the pair of plates are installed;
    a caliper housing slidably installed on the carrier;
    a piston installed in the caliper housing to move forward and backward;
    a power conversion device configured to move the piston forward and backward to press the pair of pad plates toward the brake disc;
    an actuator comprising a motor provided to provide a rotational force to the piston and a reduction device provided to reduce the rotational force of the motor and transmit the reduced rotational force to the power conversion device; and
    a controller provided to control the motor,
    wherein the controller is configured to:
        determine whether a braking operation mode and a braking release mode are consecutively continued and repeated;
        determine, when the braking operation mode and the braking release mode are consecutively continued and repeated, whether a clamping force between the brake disc and the brake pad is not released after the braking operation mode is changed to the braking release mode depending on brake pedal information and clamping force information; and
        control the motor to release the clamping force based on the clamping force information when the clamping force is not released after the braking operation mode being changed to the braking release mode,
    the controller is further configured to:
        rotate the motor in a release direction opposite to an operation direction of an electromechanical brake when the clamping force is not released, and
        determine from a map a target motor current value for releasing the clamping force depending on a clamping force value and rotate the motor with the determined target motor current value.

2. The electromechanical brake system according to claim 1, wherein
    the controller is configured to determine whether the braking operation mode and the braking release mode are consecutively continued and repeated based on a rotation direction of the motor.

3. The electromechanical brake system according to claim 2, wherein
    the controller is configured to determine that the braking operation mode is performed when the motor rotates in one direction and determine that the braking release mode is performed when the motor rotates in an opposite direction opposite to the one direction.

4. The electromechanical brake system according to claim 1, wherein
    the controller is configured to determine whether the clamping force is not released in a state in which a driver does not intend to brake based on the brake pedal information and the clamping force information.

5. The electromechanical brake system according to claim 4, wherein
the state in which the driver does not intend to brake is a state in which the driver completely releases his/her foot from the brake pedal.

6. The electromechanical brake system according to claim 1, wherein
the map has a correlation in which the target motor current value increases as the clamping force value increases.

7. A control method of an electromechanical brake system, which comprises: a pair of pad plates to which brake pads for pressing a brake disc rotating together with a wheel are attached; a carrier on which the pair of plates are installed; a caliper housing slidably installed on the carrier; a piston installed in the caliper housing to move forward and backward; a power conversion device configured to move the piston forward and backward to press the pair of pad plates toward the brake disc; and an actuator comprising a motor and a reduction device provided to provide a rotational force to the piston, the control method comprising:
determining whether a braking operation mode and a braking release mode are consecutively continued and repeated;
determining whether the braking operation mode is changed to the braking release mode when the braking operation mode and the braking release mode are consecutively continued and repeated;
determining whether a clamping force between the brake disc and the brake pad is not released after being changed to the braking release mode depending on brake pedal information and clamping force information when the braking operation mode is changed to the braking release mode; and
controlling the motor to release the clamping force based on the clamping force information when the clamping force is not released after the braking operation mode being changed to the braking release mode,
wherein
the controlling of the motor to release the clamping force comprises rotating the motor in a release direction opposite to an operation direction of an electromechanical brake when the clamping force is not released, and
the controlling of the motor to release the clamping force comprises determining from a map a target motor current value for releasing the clamping force depending on a clamping force value and rotating the motor with the determined target motor current value.

8. The control method according to claim 7, wherein
the determining of whether the braking operation mode and the braking release mode are consecutively continued and repeated comprises determining whether the braking operation mode and the braking release mode are consecutively continued and repeated based on a rotation direction of the motor.

9. The control method according to claim 7, wherein
the determining of whether the clamping force is not released comprises determining whether the clamping force is not released in a state in which a driver does not intend to brake based on the brake pedal information and the clamping force information.

10. The control method according to claim 7, wherein
the determining of whether the clamping force is not released comprises determining whether the clamping force is not released in a state in which a driver completely releases his/her foot from the brake pedal.

* * * * *